No. 12,457. REISSUED FEB. 20, 1906.

C. B. RATHBUN.

LEATHER STRETCHING CLAMP.

APPLICATION FILED NOV. 29, 1905.

Witnesses

Edwin L. Jewell

L. B. Bridgee

Inventor,

Charles B. Rathbun

By Davis & Davis

Attorneys.

UNITED STATES PATENT OFFICE.

CHARLES B. RATHBUN, OF CANTON JUNCTION, MASSACHUSETTS.

LEATHER-STRETCHING CLAMP.

No. 12,457. Specification of Reissued Letters Patent. Reissued Feb. 20, 1906.

Original No. 796,531, dated August 8, 1905. Application for reissue filed November 29, 1905. Serial No. 289,700.

*To all whom it may concern:*

Be it known that I, CHARLES B. RATHBUN, a citizen of the United States of America, and a resident of Canton Junction, county of Norfolk, State of Massachusetts, have invented certain new and useful Improvements in Leather-Stretching Clamps, of which the following is a full and clear specification, reference being had to the accompanying drawings, in which—

Figure 1:
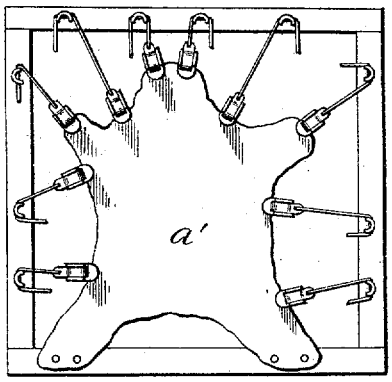
Figure 2:
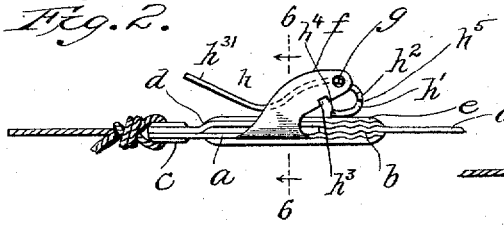
Figure 3:
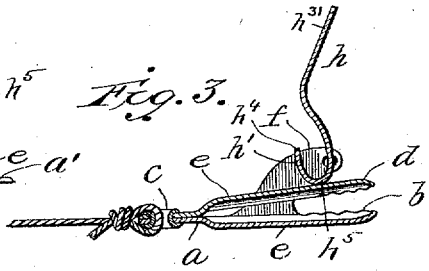
Figure 4:
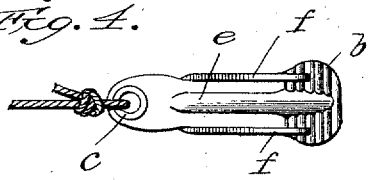
Figure 5:
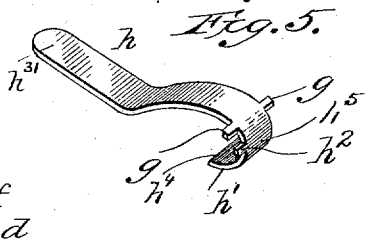
Figure 6:
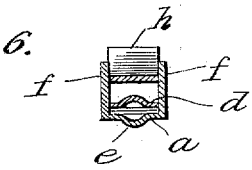

Figure 1 is a plan view showing one use to which my improved clasp may be advantageously put; Fig. 2, a side elevation of the clasp, showing it clamped to the edge of a piece of material; Fig. 3, a longitudinal vertical section showing the clasp open; Fig. 4, a plan view of the device with the cam-lever removed; Fig. 5, a detail perspective of the cam-lever, and Fig. 6 a transverse section on the line 6 6 of Fig. 2.

The object of this invention is to provide a simple and efficient clasp especially adapted for detachably connecting the stretching-cords to a skin in a stretching-frame, as shown in Fig. 1 of the drawings; but inasmuch as the device may be employed in other connections I do not wish to be confined in the matter of use.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings by letters, *a* designates the main plate of the clasp, which is substantially straight and whose forward end is transversely corrugated at *b* and whose rear end is provided with a hole for the reception of eyelet *c*, which attaches the rear end of the movable plate or jaw *d* to said main plate. The said rear end of this movable jaw is bent downward slightly, so as to raise the main body of the jaw above the main plate, and this movable jaw is made of resilient metal, which normally tends to swing upward to an open position, as shown in Fig. 3. The forward end of this movable jaw is provided with transverse corrugations corresponding with the corrugations *b* formed in the stationary jaw. These corrugated portions of the jaws form clamping-surfaces thereof. To increase the stiffness of the two jaws, each plate is provided with a longitudinal rib or corrugation *e*, extending substantially throughout its length and formed by simply striking up a portion of the body of the metal.

Formed integral with the main plate and extending upward and forward from the opposite side edges thereof, so as to embrace the movable jaw, is a pair of ears *f*, in the forward ends of which are provided holes for the pivots *g* of the cam-lever *h*. The longer portion $h^{31}$ of this lever is adapted to serve as a handle, and the portion at the other side of the pivot is curled or bent to form a cam $h'$, the curl and the length of this cam portion being such that when the lever is in its clamping position (shown in Fig. 2) the cam $h'$ curves forwardly and then toward the main plate *a* and then rearwardly, its free end $h^4$ terminating at a point to the rear of the pivots *g*.

To close the jaws, the cam-lever is simply swung backward on its pivot, thereby forcing the nose or cam end of the lever forward and downward upon the upper jaw, pressing the same toward the relatively movable jaw. When the lever is thus forced downward, it locks itself in the position shown in Fig. 2. The resilient curved or cam end of the lever presses resiliently against the upward-projecting rib *e*, formed in the body of the jaw. To open the clasp, it is simply necessary to force the handle end of the lever upward and forward far enough to swing the curved end of the lever backward beyond the pivots *g*, whereupon the movable jaw springs upward. A stop-lug $h^2$ is provided at one edge of the cam $h'$ in such a position with respect to the pivots *g* that it will strike in a recess $h^3$, formed in the edge of the adjacent ear *f*, and limit the forward movement of the cam-lever, the resiliency of the movable jaw serving to normally press said lug $h^2$ against the ear, and thereby hold the cam-lever in a substantially upright position, in which position it will be in convenient position for operation. By the provision of this stop-lug it will be observed that the lever is prevented from swinging frontward beyond the front edges of the jaws, where it would be somewhat in the way in attaching the clamp to the skin $a'$. The stretching-cord is attached to the clasp at its rear end by being passed through the eyelet and knotted, as shown.

It will be observed that it is important that the cam shall be resilient to accommodate leather of various thicknesses and also that its nose portion $h^5$ shall lie in front of the pivots when the clamp is closed and that its free rearwardly-extending end $h^4$ shall terminate to the rear of a vertical line drawn through the pivots, whereby said rearwardly-extending end portion shall afford a broad but resilient bearing at the point where it will be most effective—namely, immediately opposite the pivot-bearings. With a cam of the shape described another desirable result is that the resiliency of the cam alone will serve to lock the lever in its effective position, thereby avoiding the necessity of relying upon the handle or tailpiece of the lever to hold the clamp closed. It is important also that the side ears shall project forwardly and be unconnected at their forward ends to the main plate, so that there shall be formed a mouth-like space between the forward ends of the ears and the main plate, whereby the leather may be inserted directly into the clamp without bending or folding.

The device above described is perfectly adapted for use in frames employed for holding the skins in a taut condition while their surfaces are japanned or otherwise finished in heated ovens. This construction permits the clasps to be detached from the skin without detaching the cords from the stretching-frame. If the stretching-cords break, which often occurs by reason of the contraction they are subjected to in the oven, the clasps will not become detached from the skin and become lost or fall upon and mark the other skins below it in the oven.

My improved clasp is also advantageous in that it expedites the work of stretching the skins on the frames and in removing them therefrom, as is obvious. Furthermore, my clasp avoids the necessity of cutting holes in the leather or folding over the edges of the skin, and thus saves considerable in leather. It will be observed, further, that the flat corrugated jaws grasp the leather firmly and that the construction of the clasp causes a straight pull on the skin, thereby stretching the skin out absolutely flat and enabling the finishing-work to be perfectly done without puddles of varnish, which necessarily settles in all hollows if the leather be imperfectly stretched. The spring locking-lever with the cam-curl enables the lever to be operated quickly either in opening or closing and adjusts the jaws to different thicknesses of leather. The eyelet which connects the jaws at their rear ends not only securely holds the parts together, but enables the string to be attached to the clasp without being cut at the edges or openings in the parts. The clasps may be used either side up, as is evident. The device has other advantages that will be evident to persons skilled in the art of finishing leather.

What I claim, and desire to secure by Letters Patent, is—

1. In a clasp of the class described, the combination of a main plate provided at one end with a hole, and at its other end with transverse corrugations and with a pair of ears projecting upward and forward, a relatively movable jaw-plate provided at one end with a hole, and at its other end with transverse corrugations, said plate lying between the ears and being attached to the main plate by an eyelet passed through the holes in the two plates, and a lever pivoted between the forward ends of the ears, and having its forward end when the lever is in clamping position curved forwardly and downwardly in front of the pivots and then rearwardly, whereby when the lever is swung over backwardly said curved forward end will press the movable jaw toward the main jaw.

2. In a clasp of the class described, the combination of a substantially straight main plate whose forward end is adapted to serve as a jaw and whose rear end is provided with a hole and which is provided at its edges with upturned ears, another plate of substantially the same length and width as the main plate and which is adapted to lie and work between said ears and whose rear end is bent down so as to lie upon the rear end of the main plate, this downward-bent rear portion being provided with a hole, an eyelet passed through the holes in the two plates and serving to permanently connect the plates together, and an opening and closing cam-lever mounted between said ears, substantially as set forth.

3. In a clamp or clasp, the combination of a pair of plates attached rigidly and permanently together at one end, and adapted to spring apart at their other ends, these latter ends serving as jaws, ears carried by one of the plates, and a closing and locking lever pivotally mounted between said ears, and having its forward end when the lever is in clamping position extending forward beyond the pivotal point and downwardly and rearwardly and made resilient, so that it will press and lock the two jaws together resiliently when the handle end of the lever is swung backward.

4. In combination with a pair of body-plates attached together at their rear ends and adapted to swing apart at their forward ends, one of the plates being provided with ears embracing the other plate, a lever pivotally mounted between these ears and having its forward end when in clamping position curved forward and downward and rearward and made resilient, so that it will act as a spring-cam in closing the jaws, this cam portion being provided with a lateral lug adapted to strike against the ears and limit the movement of the lever when it is thrown upward and forward to open the clamp, substantially as set forth 5. In a clamp of the class described, the combination of a main plate adapted for attachment to a cord at its rear end and carrying a pair of side ears which extend forwardly to form an open mouth between the forward ends of the ears and the main plate, and clamping means embodying a self-locking lever pivoted between the forward ends of said ears, the forward end of this lever when in locked position being extended forwardly of the pivot and curved toward the main plate and then rearwardly to form a resilient closing-cam, whose free rearwardly-extending end affords a broad resilient clamping-bearing opposite the pivots of the lever.

6. A clamp comprising a main part adapted at its rear end for attachment to a cord and carrying clamping means at its forward end, said clamping means embodying a pair of forwardly-extending side ears and a clamping-lever, said lever being pivoted between the forward ends of said ears and having its forward end curled into a resilient cam, which cam when the lever is in clamping position has its curved nose portion lying forward of the pivots and its free resilient end portion curving backwardly to a point back of the pivots, whereby when the clamp is closed the free resilient end portion of the cam will afford a broad cam-bearing directly opposite the pivots, whereby a wide range of thicknesses of leather can be accommodated and the cam alone will lock the lever in its clamping position.

In testimony whereof I hereunto affix my signature, in the presence of two witnesses, this 20th day of November, 1905.

C. B. RATHBUN.

Witnesses:
FRANK E. BRADBERY.
JAMES THOMAS PUGH.